3,316,676
SEED PACKAGES OF WATER INSOLUBLE
POLYETHYLENE OXIDE
Casimer C. Legal, Jr., Elkridge, Md., Thomas H. Nichols, Atlanta, Ga., and William A. Patterson, Spartanburg, S.C., assignors to W. R. Grace & Co., Duncan, S.C., a corporation of Connecticut
No Drawing. Filed Mar. 3, 1965, Ser. No. 436,925
13 Claims. (Cl. 47—58)

This invention relates to a seed package. In one aspect the invention relates to seed and a germination-enhancing medium enclosed in a film whose integrity is destroyed when contacted with water. In another aspect, the invention relates to a method for enhancing and controlling the germination of a seed.

The planting of seed in the earth and reaping the harvest is almost as old as civilized man. However, until relatively recent times, production has depended entirely on the whims of Mother Nature. Recently, there have been dramatic changes in yield due, in part, to better tilling and soil conservation measures but more importantly to the use of fertilizers. Fertilizers are applied in a large variety of ways, either in dry or liquid form, either above or below the surface. Although yields have been greatly improved, Mother Nature still plays an important part in determining whether a seed is to germinate.

It is well known that crystalline thermoplastic materials, such as polyethylene, polyvinyls and the like, may be highly oriented by stretching to produce a material which has a built-in memory so that upon the application of heat the oriented polymer, if not restrained, will return to its original dimensions. However, quite elevated temperatures (frequently above 212° F.) must normally be employed for the shrinking operation so that the application of the technique is limited to the packaging, etc., of items that are not damaged by exposure to elevated temperatures.

In addition, a number of polymers are limited in their applications because they are highly soluble in common solvents such as water. Examples of these are the polyethers including polymeric vinyl ethers and the polyalkylene oxides. The polyvinyl ethers are generally soft and tacky and have found utility as adhesives, but are generally not suitable for the manufacture of films. The polyalkylene oxides can be made into film but are water sensitive. Polyalkylene oxide, for example, is useful as a humectant, thickener, or softener, and is normally unsuitable for films or molded objects. Some of the higher polyalkylene oxides, such as polytetramethylene oxide, are more rigid and useful in moldings. It has been found that organic, thermoplastic, normally solid, polymeric materials which are generally highly soluble in solvents at ambient temperatures are generally less soluble in the same solvent after irradiation with accelerated electrons. A number of methods have been used for reducing solubility such as the formation of association complexes by reaction with certain compounds such as phenolic resins, mineral acids, halogens, urea, lignin sulfonic acids and polycarboxylic containing compounds; however, irradiation is preferred.

Further, the orientation of the irradiated material produces a film or filament which possesses considerable shrink energy upon contact with the solvent. The polymer may also be oriented prior to reducing its solubility.

As employed herein the term "water shrinkable polymer" refers to a polymer normally soluble in water at ambient temperatures and atmosphere pressure, said polymer having been treated, such as by irradiation, so as to reduce its solubility and molecularly oriented to provide high shrink energies in the direction of orientation.

It has now been found that these treated polymeric films are especially useful in packing a product or article since it also provides a valuable means for removing the article or product from the enclosing film. If the article is tightly enclosed in said film so as to closely conform to the contours of the article, it may be stored indefinitely for sale or the like under normal indoor storage conditions. However, if the enclosing film is then contacted with a solvent, as hereinbefore described, the high shrink energy of the film results in the film literally tearing itself apart and thereby exposing the contents of the package.

It is an object of the invention to provide a seed package.

Another object of the invention is to provide a seed package suitable for controlling the germination of said seed.

Still another object is to provide a method for germinating seed.

Yet another object is to provide a method for enhancing and controlling the germination of seed.

Another object is to provide a method for planting seed in the earth.

These and other objects of the invention will be readily apparent to those skilled in the art from the following disclosure and appended claims.

These objects are broadly accomplished by enclosing the seed to be germinated in a film whose integrity is destroyed by contact with water. In one embodiment, the film also encloses a moisture holding and insulating medium and/or an enriching agent. In another embodiment, the location of the seed is marked on the film to assist in instances where it is desirable to have the seed on top or near the surface of the ground.

The seed may be any grain or ovule of plants used for sowing, e.g. vegetable seeds including peas, corn, carrots, etc. grains, fruit seeds and the like.

Accompanying the seed within the package may be a moisture holding and/or insulating medium, e.g. vermiculite and the like.

The package preferably also contains, in addition to the seed and/or moisture holding medium, an enriching agent or fertilizer or other medium capable of providing the necessary nutrients to the seed during the period of growth. Suitable fertilizers would include nitrogen, potassium, potash and magnesium.

In addition, the package may include insecticides, fungicides, nemacides, enzymes, hormones or the like in any desired combination which will assist in the germination of the seed and growth of the plant.

By providing all essential ingredients in a single package, not only is planting technique simplified, but growth is stimulated. In effect, each package is a miniature hot house. The vermiculite also assists in retaining water in the area where it is needed. A gelling substance may also be admixed with the vermiculite.

The package or capsule may be stored for long periods of time without danger of germination since the film is sealed and prevents atmospheric moisture from entering. However, care must be taken not to expose the packet to the direct action of water. When the growing season arrives, the seeds are then placed in an environment conducive to germination, which is generally soil, and exposed to water. The film may be perforated if desired but this is not preferred since it increases the danger of moisture prematurely entering the sealed bag.

The amount of the various components, including seeds, in the package will depend on the type of seed and soil or other germinating conditions. Sufficient vermiculite or the like is employed to retain moisture. Sufficient fertilizer or the like is employed to provide the proper growth and rate of growth for the seed used. The fertilizer may be a slow-release fertilizer which releases its nutrients at about the rate necessary for good growth instead of dissolving all at once.

The seed and other components may be sealed in any suitable manner. For example, the seed, etc. may be placed in a small bag made by sealing one end of a tubing of the film, and then sealing the other end to enclose the seed, etc.; or the seed may be placed between two sheets of film and the edges sealed to form a small pouch; or a plurality of seeds may be placed on a strip of film at predetermined locations, another strip sealed over the seeds to place the seeds in pockets, and the entire strip may then be laid in the ground, or the individual pockets separated; or the seeds can be placed in a row in individual pockets by sealing the spaced seeds within a tubing.

Any film may be employed for enclosing the seed and other components which will protect the seed during storage but which will be destroyed when placed in an environment conducive for germination, e.g. soil, and subjected to water. The film may dissolve or react with the water or otherwise destroy itself. Soluble polymers, such as polyvinyl alcohol and water-shrinkable polymers, such as irradiated, oriented polyalkylene oxides are preferred.

Particularly preferred polymers include the polyalkylene oxides with the recurring unit —$(CH_2)_n$—O— wherein $n$ is a plural integer of up to 4, said films having been irradiated and biaxially oriented. Examples of these polyethers are polyethylene oxide and polytetramethylene oxide. A further class of hydrocarbon ethers are the polyvinyl ethers which have the unit

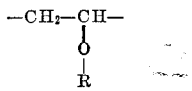

wherein R is a radial, generally hydrocarbon and preferably alkyl, of usually up to 8 carbons. Examples of such ethers are polymers of methyl vinyl ether, isoproply vinyl ether, and 2-ethylhexyl vinyl ether. The preferred polymer is polyethylene oxide.

After formation of the film, such as by extruding through a die, and cooling of same to solidify, it is subjected to irradiation by any suitable means such as disclosed in the patent to Baird et al., U.S. Patent Number 3,022,543, and Rainer et al., U.S. Patent Number 2,877,500. The polymer is subjected to sufficient dosage to reduce the solubility of the polymer in water. The dosage depends on the molecular weight and the structure of the molecule. Preferably, the polymer is irradiated at a dosage of at least 1, more preferably 2 to 20 megarads.

A REP as recognized in the art is defined as that amount of nuclear irradiation dissipating 93 ergs of energy per gram of tissue producing $1.61 \times 10^{12}$ ion pairs in the process. An alternative unit is the Rad which is defined as representing 100 ergs of energy per gram imparted by ionizing particles to the irradiated material at the point of interest.

The polymer is generally subjected to irradiation at ambient temperatures with the reduction in solubility proceeding more rapidly at elevated temperatures; however, the temperature is less than the crystalline melt point, more preferably less than 90° F. for polyethylene oxide.

The film may be of any suitable dimension so long as the irradiation is effective for reducing solubility of the polymer unit.

Irradiation can be accomplished by various methods. Thus, there can be used electron, X-rays, gamma rays by employing iron 59 or cobalt 60, beta-rays, e.g., by employing cobalt 60, carbon 14, phorphorus 32, strontium 90, and ultra-violet light. Preferably, electrons of at least $10^5$ electron volts energy are employed. A suitable irradiation source is a Van de Graaff type electron accelerator manufactured by the High Voltage Engineering Corporation, Burlington, Mass., operated at 2,000,000 volts and a power output of 500 watts. Alternatively, there can be employed other sources of high energy electrons, such as the General Electric 2,000,000 volts, 10 kw., resonant transformer unit or the corresponding 1,000,000 volt, 5 kw., General Electric resonant transformer of a linear accelerator.

The time of irradiation is not critical but needs merely be sufficient to give a dosage of sufficient REP. The voltage, likewise, can be varied quite widely, but for rapid irradiation of thick or multi-layer materials, is desirably high, e.g., 500,000 or 1,000,000 or 2,000,000 or 3,000,000 or even higher. By appropriate combination of time of treatment, voltage and beam current, the desired dosage is obtained.

Subsequent to the irradiation of the polymeric member, (although irradiation may take place after orientation) it is oriented monoaxially or biaxially or omniaxially by any suitable means such as by stretching or by inflating. Orientation is discussed herein with reference to biaxial orientation (actually omniaxially oriented) wherein the molten polymer is extruded through an annular die to form a tube which is solidified. The tube or tape is then inflated by air pressure or any suitable fluid, thereby biaxially orienting the polymer. The resulting bubble is deflated to form a flattened tubing or tape which may be slit to form a film.

It has been found that this oriented, irradiated material may be shrunk merely by contacting it with water. For example, a film of polyethylene oxide in an oriented state may be immersed in a water bath at approximately room temperature and considerable shrink force will develop immediately. Non-irradiated polyethylene oxide is completely soluble in water. It has been found that a suitable irradiated polyethylene oxide is one that has an increased insoluble content, preferably not less than 30%, even more preferably 50 to 90%.

Insoluble content refers to the non-extractable portion of the irradiated oriented polymer in benzene. Insolubility is determined by weighing the sample, extracting the benzene for 20 hours at its boiling point in apparatus designed for ASTM-D-147. The benzene insoluble portion is dried at reduced pressure in vacuum oven at 55–60° C. for no less than 38 hours.

Since there is a three dimensional network, there is little difference in solubility of a given polymer in a specific solvent so long as sufficient solvent is used to insure that saturation has not occurred. Thus, the insolubility of the polymer in water is essentially the same as its insolubility in benzene. The irradiated oriented material will shrink to about its original dimensions. An inch strip of about 1 mil thick oriented polymer preferably has a shrink energy of at least 0.1 pound, preferably 0.2–2.0 pounds.

Shrink energy is the force of contraction at a given temperature when the material is restrained. More specifically, it is the measurable tension in a fully monodirectionally restrained strip of film when the film is heated to the specified temperature (e.g. 96° C.). Shrink energy is determined herein by measuring the force exerted by a 1 inch wide strip mounted between two arms of a holder, one arm of which is stationary and the other is connected to an electronic strain gauge.

The film preferably tightly encloses the article so as to closely conform to the contours of the article. When using the water shrinkable films, the tightness of the film must be sufficient so that subsequent shrinkage of the film will result in rupturing of the film. A particularly suitable technique is to wrap the film about the article, heat seal the overlapped edges and then shrink the film to a skin tight fitting. Removal of air is not necessary since it is only necessary to create tension on the film. The first shrinking step can be by heat or solvent, preferably by subjecting the package to heat shrinking temperatures for a period of time sufficient only to form the skin tight film. For treated polyethylene oxide, suitable conditions are 150° to 200° F. for 0.1 to 1.0 second depending on tightness desired. When the package is then contacted with water, such as by planting in the earth, and adding water (either manually or by rain) the shrink energy of these films is so great that the film rupture, thus exposing the contents of the package and permitting germination.

Preferably the shrinking operation takes place at a temperature satisfactory for germination (e.g. temperatures in the range of 50° F. to 100° F.) which is less than that at which significant shrinkage occurs due to temperature.

The polymeric films may include additives such as stabilizers, antislip agents, antistatic agents, fillers, pigments and the like.

The invention is best illustrated by the following examples:

*Example I*

Capsules were prepared consisting of 4 tomato seeds in a small bag made from film of a high molecular weight polymer of polyethylene oxide [1] which had been irradiated to 4 MR. The film had been biaxially oriented about 300% in each direction to form a water-shrinkable film. The overlapping edges were heat sealed to form a capsule which ranged in dimensions from 1/4 inch in diameter by 1 inch long to 1 inch in diameter by 4 inches long. The capsule was subjected to heat sufficient to form a very tight fitting package.

A capsule prepared as above was planted in a container of soil and subjected to water in sufficient quantity to enhance growth. The package was maintained at room temperatures. In 6 days germination had begun.

*Example II*

A capsule prepared as above with the addition of 3 grams of vermiculite (a moisture holding and insulating medium) was subjected to the same planting action. In about 6 days germination had begun at room temperature.

*Example III*

Similar results were obtained with a capsule prepared as stated in Example I with the addition of 1/2 gram of a fertilizer [2] (an enriching agent) and subjected to the same planting action. After holding the package at room temperature for 6 days, germination had begun.

*Example IV*

A capsule prepared as stated in Example I with the addition of 3 grams of vermiculite #4 and 1/2 gram of a fertilizer [2] was subjected to the same planting action. In 6 days germination had begun at room temperature.

While certain examples, structures, composition and process steps have been described for purposes of illustration, the invention is not limited to these examples. Variation and modification within the scope of the disclosure and the claims can readily be effected by those skilled in the art.

---

[1] WSR-301, Union Carbide Corp., 30 E. 42nd St., New York, N.Y., a high molecular weight aqueous solution of polyethylene oxide (1% concentration) having a viscosity in the range of 2000–4000 centipoises at 25° C. using a Brookfield Viscometer RVF at 2 r.p.m. with the largest spindle. The melt viscosity was about 100,000–110,000 poises at 150° C.

[2] Mag Amp R, Davison Chemical Division, W. R. Grace & Company.

We claim:
1. A seed package for controlling the germination of said seed comprising a seed and a germinating-enhancing medium tightly enclosed within a water skrinkable but substantially water insoluble polymeric film whose integrity is destroyed by contact with water so as to expose said seed and medium.

2. The article of claim 1 wherein said medium comprises a moisture holding and insulating medium.

3. The article of claim 1 wherein said medium comprises a plant nutrient.

4. The article of claim 1 wherein said medium comprises a moisture holding and insulating medium, and a plant nutrient.

5. The article of claim 1 wherein said article includes a means of the exterior surface of said film for identifying the location of said seed therein.

6. A seed package for controlling the germination of said seed comprising
   (a) components comprising
       (1) at least one seed,
       (2) vermiculite, and
       (3) a fertilizer,
   (b) enclosed in a water shrinkable but substantially water insoluble, irradiated biaxially oriented polyethylene oxide film, said film closely conforming to the contours of said components and retaining sufficient energy to rupture when contacted with water.

7. The package of claim 6 having means on the exterior surface of said film for identifying the position of said seed therein.

8. A method for preparing a seed package suitable for planting comprising:
   (a) enclosing at least one seed within a film comprising a water shrinkable but substantially water insoluble, oriented film material, and
   (b) shrinking said film about said seed to form a package by subjecting said film to a heat shrinking temperature for a period of time sufficient to cause said film to closely conform to the contours of said seed without rupturing said film.

9. The method of claim 8 wherein said seeds are enclosed in a series of sealed, spaced apart pockets contained in a strip of said film.

10. The method according to claim 8 wherein said capsule also contains a moisture holding and insulating medium.

11. The method according to claim 8 wherein said capsule also contains a plant nutrient.

12. The method according to claim 8 wherein said capsule includes indicia on the exterior surface of said film for identifying the position of said seed therein.

13. The method of claim 8 wherein said film material comprises an irradiated, biaxially oriented polyethylene oxide.

References Cited by the Examiner

UNITED STATES PATENTS

| | | | |
|---|---|---|---|
| 526,512 | 9/1894 | Weber et al. | 47—56 |
| 2,648,165 | 8/1953 | Nestor | 47—56 |
| 2,785,969 | 3/1957 | Clawson. | |
| 2,967,376 | 1/1961 | Scott | 47—1 |
| 3,080,681 | 3/1963 | Merrill et al. | 47—56 |

ABRAHAM G. STONE, *Primary Examiner.*

R. E. BAGWILL, *Assistant Examiner.*